(12) United States Patent
Thai et al.

(10) Patent No.: US 7,055,396 B1
(45) Date of Patent: Jun. 6, 2006

(54) SENSOR ASSEMBLY FOR MAGNETIC FLOWMETER AND METHOD OF MANUFACTURE

(75) Inventors: Anthony Thai, Orange, CA (US); Gert Burkhardt, Pasadena, CA (US)

(73) Assignee: George Fischer Signet, Inc., El Monte, CA (US)

( * ) Notice: Subject to any disclaimer, the term of this patent is extended or adjusted under 35 U.S.C. 154(b) by 0 days.

(21) Appl. No.: 11/092,460

(22) Filed: Mar. 28, 2005

(51) Int. Cl.
*G01F 1/58* (2006.01)
(52) U.S. Cl. .................................. 73/861.12
(58) Field of Classification Search ............. 73/861.12, 73/861.11, 861.13, 861.15, 861.16, 861.17
See application file for complete search history.

(56) References Cited

U.S. PATENT DOCUMENTS

| | | | |
|---|---|---|---|
| 5,583,299 A | 12/1996 | Murase | |
| 5,767,418 A | 6/1998 | Davis | |
| 5,817,948 A * | 10/1998 | Davis | 73/861.12 |
| 5,847,287 A * | 12/1998 | Davis | 73/861.15 |
| 5,925,830 A | 7/1999 | Schalk | |
| 6,171,277 B1 * | 1/2001 | Ponzi | 604/95.04 |
| 6,260,420 B1 | 7/2001 | Ketelsen et al. | |
| 6,626,048 B1 | 9/2003 | Dam Es et al. | |

* cited by examiner

*Primary Examiner*—Jewel V. Thompson
(74) *Attorney, Agent, or Firm*—Sheppard, Mullin, Richter & Hampton LLP

(57) ABSTRACT

A sensor assembly for a magnetic flowmeter is provided that is cost-effective to manufacture, while incorporating an effective seal against leakage and enabling precise positioning of electrodes. The sensor assembly includes an electrode assembly and a plastic housing molded about the electrode assembly. The electrode assembly includes an electrode and a plastic base disposed about the lower end of electrode. The housing includes a wall in direct contact with the plastic base such that the tip of the electrode projects from the wall, facilitating a secure seal about the electrode. The sensor assembly further includes a magnetic assembly configured to provide a magnetic field extending beyond the wall of the housing.

14 Claims, 3 Drawing Sheets

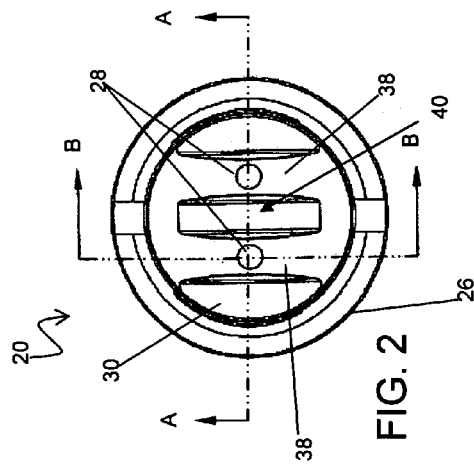
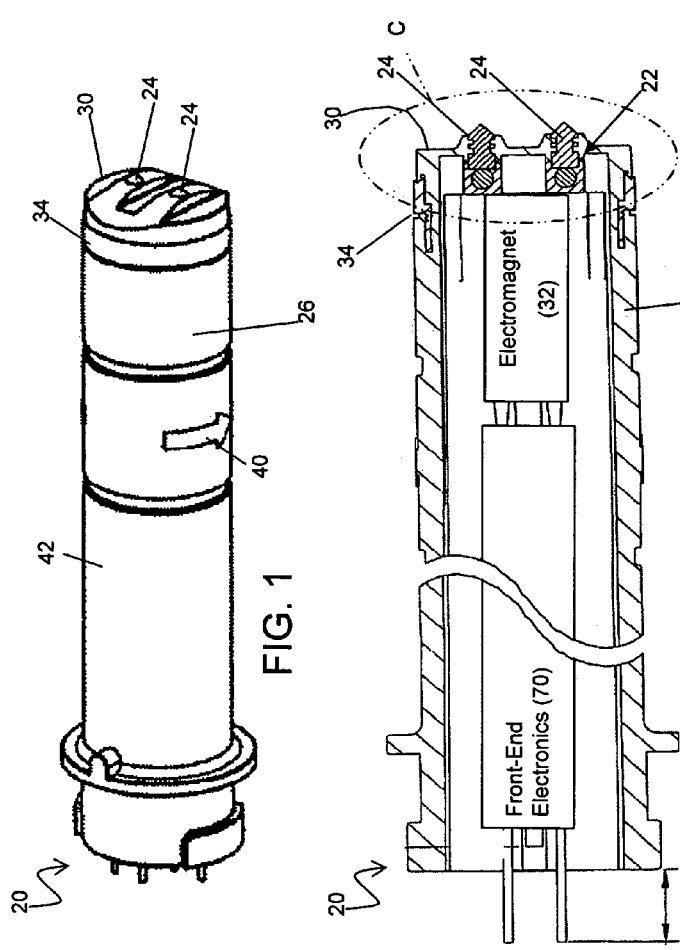
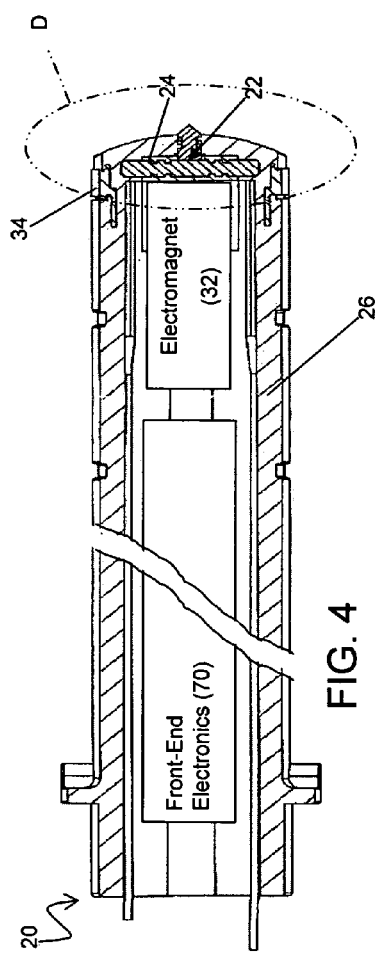

SENSOR ASSEMBLY FOR MAGNETIC FLOWMETER AND METHOD OF MANUFACTURE

BACKGROUND OF THE INVENTION

The present invention relates generally to magnetic flowmeters and, more particularly, to a magnetic flowmeter having electrodes in close proximity to its electromagnet.

Magnetic flowmeters have long been used to measure the flow of electrically conductive fluids. Magnetic flowmeters are governed by Faraday's law of electromagnetic induction, which provides that a conductor passing through a magnetic field induces of voltage across the conductor. Typically, a magnetic flowmeter exposes a conductive fluid to a magnetic field whose plane typically is oriented transverse to the direction of flow. As conductive fluid passes through the magnetic field, a voltage is induced. Such flowmeters typically include a pair of electrodes set apart from each other and in electrical contact with the fluid, to measure the induced voltage. Based on this measured voltage, the average velocity of the fluid can be determined.

Various configurations of flowmeters have been used, such as, bore-type and insertion-type. In a typical bore-type configuration, magnetic coils are mounted externally to a section of pipe and two electrodes extend into the interior of the pipe at opposite sides. The electrodes form an axis along the plane of the magnetic field, perpendicular to the fluid flow. Insertion-type flowmeters typically include a sensor assembly housing both a magnetic source and a pair of electrodes. In use, the sensor assembly is positioned with the electrodes in contact with the fluid flow.

For an accurate reading, it is beneficial to maintain a stable and strong magnetic field within the measured region between the electrodes. Notably, the strength of a magnetic field increases relative to its proximity to the magnetic source. Thus, it is beneficial to position the electrodes and the magnetic source in close proximity to each other. The magnetic source must also be sealed from the fluid, whereas the electrodes are in contact with the fluid. Thus, the electrodes and adjacent structure must provide adequate sealing against leakage.

Various approaches have been implemented for sealing the magnetic source from the fluid. These approaches commonly incorporate fairly complex structure, inhibiting proximity of the magnetic source to the electrodes. Moreover, current approaches can be relatively expensive to manufacture. Less expensive alternatives tend to sacrifice sensitivity and accuracy, which, in certain instances, can be attributed to imprecise positioning of the electrodes relative to one another or relative to the magnetic source.

It should, therefore, be appreciated that there remains a need for a magnetic flowmeter that is cost effective to manufacture while providing precise positioning of the electrodes relative to one another and in close proximity to the magnetic source. It should also be appreciated that there remains a need for a magnetic flowmeter incorporating an effective seal about the electrodes. The present invention fulfills this need and others.

SUMMARY OF THE INVENTION

Briefly, and in general terms, the invention provides a sensor assembly for a magnetic flowmeter that is cost effective to manufacture, while incorporating an effective seal against leakage and that enables precise positioning of electrodes. The sensor assembly includes an electrode assembly and a plastic housing molded about the electrode assembly. The electrode assembly includes an electrode and a plastic base disposed about the lower end of electrode. The housing includes a wall in direct contact with the plastic base such that the tip of the electrode projects from the wall, facilitating a secure seal about the electrode. The sensor assembly further includes a magnetic assembly configured to provide a magnetic field extending beyond the wall of the housing.

More specifically, by way of example and not limitation, the electrode has an axial portion that includes the tip, and the lower end of the electrode is oriented generally transverse to the axial portion. Both the axial portion and the transverse portion can include notches configured to interlock with the housing and the plastic base, respectively. Moreover, a portion of the plastic base can be fused with the wall of the plastic housing, to aid in sealing.

In a detailed aspect of an exemplary embodiment, the base defines a projection disposed about the electrode and projecting towards the tip of the electrode. The projection can be configured to encircle the electrode. The projection can also be fused with the wall of the housing, to aid in sealing.

In another exemplary embodiment in accordance with the invention, the electrode assembly includes first and second electrodes spaced apart from each other and a plastic base disposed about lower ends of the electrodes. The plastic base defines projections disposed about the electrodes and projecting towards the tip of the electrode. The plastic housing is disposed about the electrode assembly such that the tips of the electrodes project from a distal end of the housing and that the plastic base contacts the end wall of the housing. The end wall of the housing can include parallel ridges spaced apart from each other defining a valley such that the tips of the electrodes each project from a corresponding ridge of the end wall. The sensor assembly further includes a magnetic assembly disposed within a cavity of the housing, proximate to the first and second electrodes. The magnetic assembly is configured to provide a magnetic field extending beyond the end wall of the housing.

The invention also provides a method of manufacturing a sensor assembly for a magnetic flowmeter. The method includes forming an electrode assembly having a plastic base and molding a plastic housing about the electrode assembly such that the plastic base is in contact with a wall of the housing.

In a detailed aspect of an exemplary method in accordance with the invention, the method can include positioning a magnetic assembly within a cavity of the housing proximate to first and second electrodes. The magnetic assembly preferably is configured to provide a magnetic field extending beyond a wall of the housing.

In other detailed aspects of exemplary methods, the electrode assembly includes first and second electrodes. The first and second electrodes can each have an axial portion and a lower end oriented generally transverse to the axial portion. The plastic base can be molded about the lower ends of the electrodes. In addition, a portion of the plastic base can be become fused with the end wall of the plastic housing, as a result of molding the housing about the electrode assembly.

In yet other detailed aspects of exemplary methods, the base is formed to define first and second projections disposed about a corresponding electrode, each projection projecting towards the tip of the electrode. The projections can be configured to encircle the electrodes and to become fused with the wall of the housing, as a result of the molding the housing about the electrode assembly.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 1 is a perspective view of an embodiment of a magnetic flowmeter sensor assembly in accordance with the invention, depicting a two electrodes extending from a tip of a housing assembly and a grounding ring disposed about the housing assembly.

FIG. 2 is a top plan view of the sensor assembly of FIG. 1.

FIG. 3 is a cross-sectional view of the sensor assembly of FIG. 1, taken along line A—A of FIG. 2.

FIG. 4 is a cross-sectional view of the sensor assembly of FIG. 1, taken along line B—B of FIG. 2.

DETAILED DESCRIPTION OF THE PREFERRED EMBODIMENTS

Figure 7:
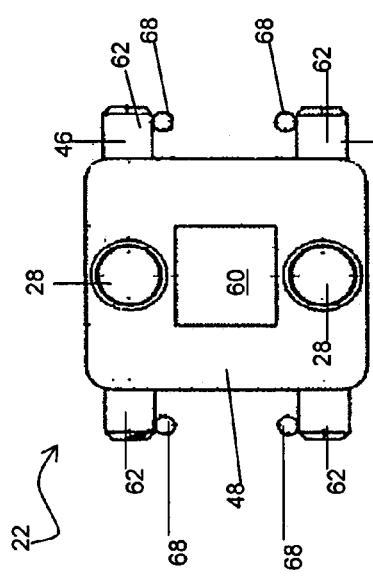
FIG. 7 is a top plan view of an electrode assembly of the sensor assembly of FIG. 1.

With reference now to the drawings, and particularly FIGS. 1, 2, and 7, there is shown an insertion-type sensor assembly 20 for a magnetic flowmeter. The sensor assembly includes an electrode assembly 22 (FIG. 7) having two electrodes 24 extending from a housing 26. The housing is over-molded about the electrode assembly such that the tips 28 of the electrodes project from an end wall 30 of the housing, providing a secure seal to guard against leakage. The sensor assembly further includes an electromagnet 32 disposed within a cavity of the housing proximate to the electrodes and a grounding ring 34 disposed about a distal end 36 of the housing.

In use, the electrodes 24 and the grounding ring 34 are in contact with the fluid, while the electromagnet 32 generates a magnetic field beyond the distal end of the sensor assembly. The magnetic field induces an electrical current in the fluid perpendicular to the fluid flow. The electrodes are positioned to pick up the induced current. Since the electromagnet and the electrodes are in close proximity (see, FIGS. 3–4), the resulting measurement is particularly accurate.

The housing 26 includes two parallel ridges 38 that extend across the end wall 30 of the housing, defining a valley 40 across the diameter of end wall. Each electrode projects from a mid point of a corresponding ridge. A measuring line (A) across the valley can be defined by the tips 28 of the electrodes. A reference arrow 40 (FIG. 1), is provided on a side wall 42 of the housing to ensure proper alignment of the sensor assembly relative to fluid flow, such that, the measuring line (A) is oriented transverse to the fluid flow. In this orientation, the valley is aligned with the fluid flow, and the fluid flow is transverse to the magnetic field of the electromagnet 32.

Figure 5:
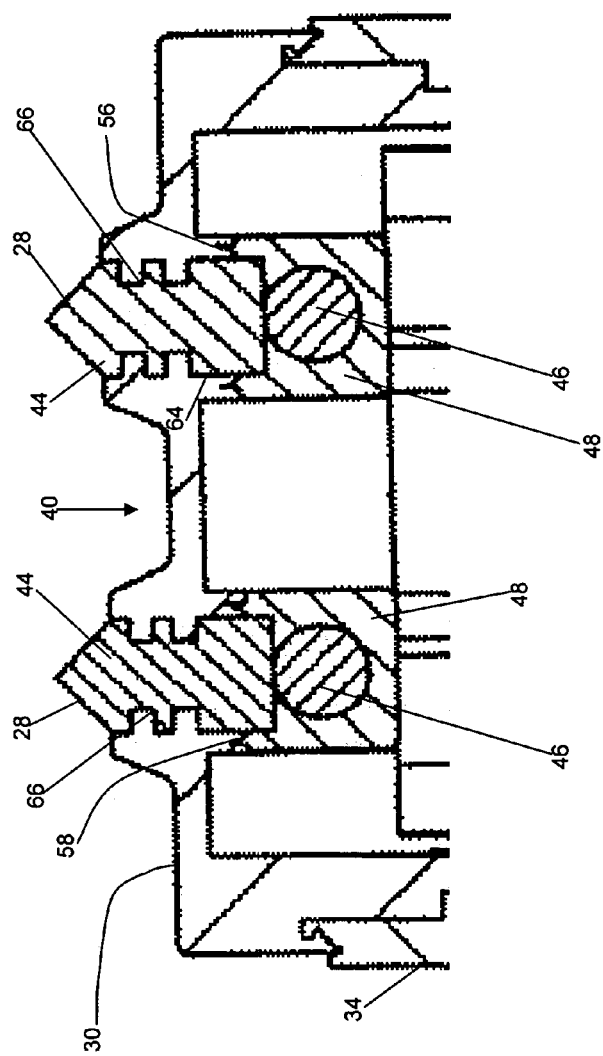
FIG. 5 is a close-up view of area C of FIG. 3, depicting a tip portion the sensor assembly of FIG. 1
Figure 6:
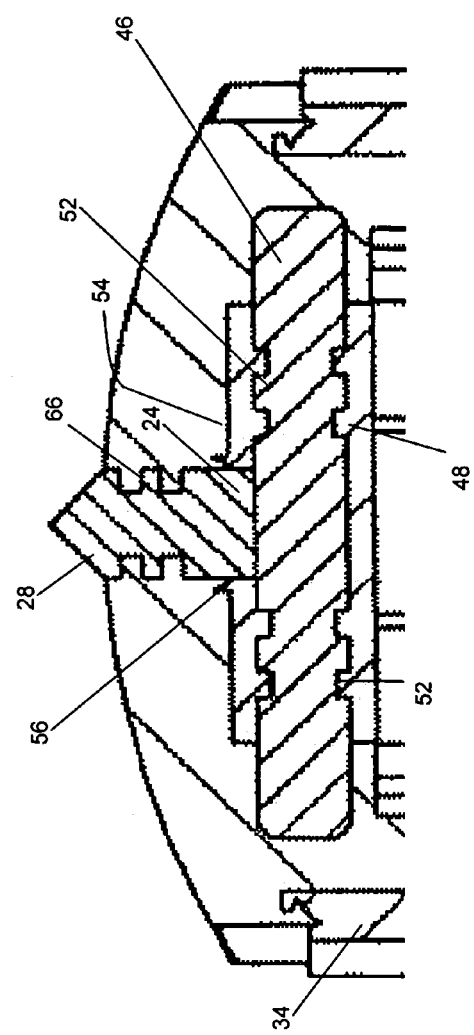
FIG. 6 is a close-up view of area D of FIG. 4, depicting the tip portion the sensor assembly of FIG. 1.

With reference now to FIGS. 5 and 6, the electrodes 24 are T-shaped, including an axial portion 44 extending out the end wall 30 of the housing and a transverse portion 46 disposed within a plastic base 48 of the electrode assembly. The electrodes are configured to facilitate a secure seal against fluid leakage into the cavity of the housing 26. To that end, each electrode has a portion of its length embedded in the plastic base, and the side wall of each electrode defines a plurality of ridges 50 encircling the electrode, providing a strong seal between the electrode and the housing, given the length of the electrode. As best seen in FIG. 6, the transverse portions of the electrodes define notches 52 to facilitate a secure attachment to the plastic base.

The plastic base 48 includes an upper surface 54 that defines projections, two collars 56, each collar encircling the axial portion 44 of the corresponding electrode. The collars have a constant profile as they encircle each axial portion, terminating in a pointed leading edge 58. The collars are configured such that, during manufacturing, a leading edge 58 of each collar at least partially melts during the molding of the housing, further fusing the plastic base and the housing for enhanced sealing about the electrodes. In other embodiments, projections of various other configurations can be provided about the electrodes.

Figure 8:
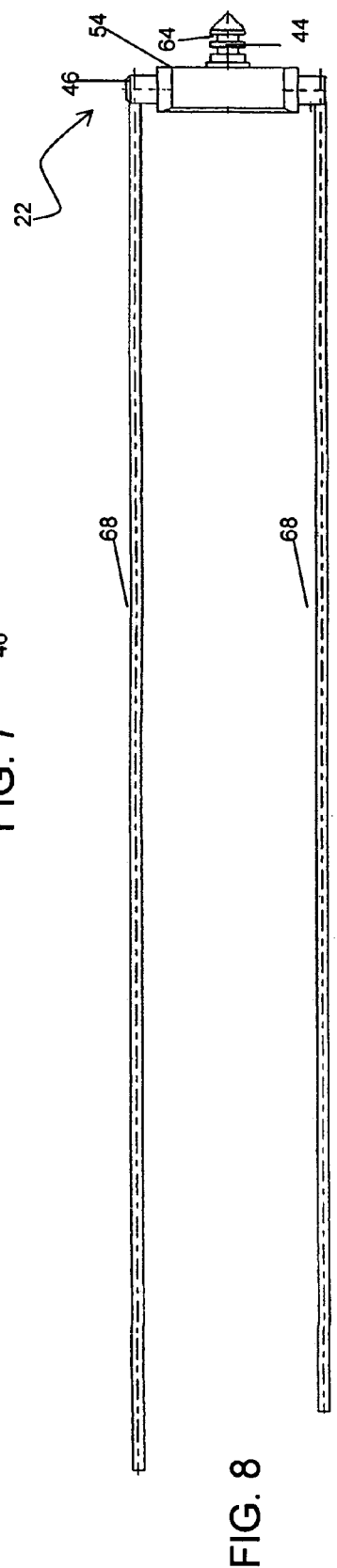
FIG. 8 is a first side elevational view of the electrode assembly of the sensor assembly of FIG. 1.
Figure 9:
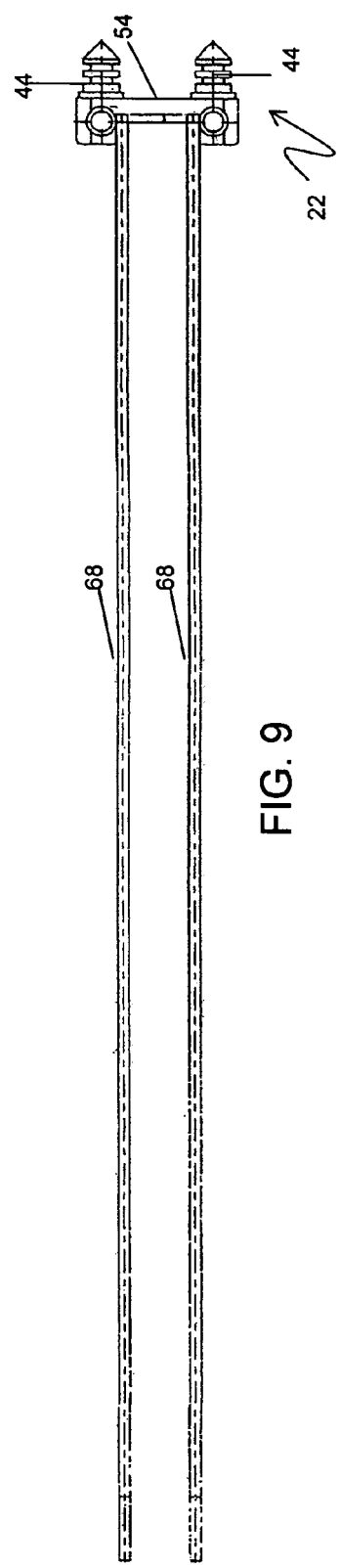
FIG. 9 is a second side elevational view of then electrode assembly of the sensor assembly of FIG. 1.

With reference now to FIGS. 7–9, the plastic base 48 has a generally rectangular cross-section, defining a central opening 60. The plastic base is formed about the electrodes such that the transverse portions 46 are parallel to each other and have ends 62 extending out the sides of the base. The electrodes 24 are T-shaped, including the axial portion 44 extending out the end wall of the housing and the transverse portion 46 disposed within a plastic base of the electrode assembly. The axial portion includes a side wall 64 to aid in secure mating with the end wall of the housing. More particularly, the side wall defines notches 66 that circumscribe the axial portion of the electrodes. The housing 26 is molded about the electrode assembly such that the end wall conforms within the notches of the axial portion, mechanically locking the end wall and the electrodes.

Four wires 68 are attached to the electrodes 24, providing conductivity between the electrodes and front-end electronics 70 (FIG. 2). In other embodiments, different number of wires can be used. The front-end electronics communicate with back-end electronics (not shown) to drive the electromagnet 32 and process the signal from the electrodes. Two wires are attached to each electrode, which provides a certain measure of reliability and redundancy. In the exemplary embodiment, each wire is spot welded to a corresponding end 62 of the transverse portion of the respective electrode. In the exemplary embodiment, the electrodes are formed of stainless steel. In other embodiments, various other materials can be used, as needed. For example, various Ni alloys have been found to be beneficial, particularly for measuring flow of acids.

In an exemplary method of manufacture, the electrode assembly 22 and the housing 26 are formed in separate molding stages. The electrodes are positioned in a mold for forming the base about the transverse portions of the electrodes, forming the electrode assembly. The electrode assembly and the grounding ring 34 are then disposed in a mold configured to form the housing 26. The electrode assembly can be held in place by a structure supporting the plastic base of the assembly. The molding of the housing is conducted such that the leading edge of each collar 56 at least partially melts, fusing the base and the end wall, i.e., commingling material of the base and the end wall, which facilitates a secure seal about the electrodes. Moreover, the housing is molded such that the end wall interlocks with the notches 66 of the transverse portions the electrodes, further ensuring a secure seal. In this embodiment, the housing is formed of PVDF or polypropylene; however, other materials can be used. After molding, the electromagnet 32 and the front-end electronics 70 are positioned in the cavity of the housing. In the exemplary method, the molding of the plastic base and the molding of housing are both performed a single shot, a single material injection mold; however, multiple materials and shots can be used.

It should be appreciated from the foregoing that the present invention provides a sensor assembly for a magnetic flowmeter that is cost effective to manufacture, while incorporating an effective seal against leakage and that enables precise positioning of electrodes. The sensor assembly includes an electrode assembly and a plastic housing molded about the electrode assembly. The electrode assembly includes an electrode and a plastic base disposed about the lower end of electrode. The housing includes a wall in direct contact with the plastic base such that the tip of the electrode projects from the wall, facilitating a secure seal about the electrode. The sensor assembly further includes a magnetic assembly configured to provide a magnetic field extending beyond the wall of the housing.

Although the invention has been disclosed in detail with reference only to the exemplary embodiments, those skilled in the art will appreciate that various other embodiments can be provided without departing from the scope of the invention. Accordingly, the invention is defined only by the claims set forth below.

We claim:

1. A sensor assembly for a magnetic flowmeter, comprising:
   an electrode assembly including an electrode and a plastic base, the electrode having a tip and a lower end, the plastic base disposed about the lower end of the electrode;
   a plastic housing molded about the electrode assembly to seal against leakage about the electrode, the housing including a wall in direct contact with the plastic base, the tip of the electrode projecting from the wall, wherein a portion of the plastic base is fused with the wall of the plastic housing; and
   a magnetic assembly configured to provide a magnetic field extending beyond the wall of the housing.

2. A sensor assembly as defined in claim 1, wherein an axial portion of the electrode includes the tip, and the lower end of the electrode is oriented generally transverse to the axial portion.

3. A sensor assembly as defined in claim 1, wherein a side wall of the electrode defines notches mechanically locked with the wall of the housing.

4. A sensor assembly as defined in claim 1, further comprising a grounding element configured to be in contact with fluid, when in use.

5. A sensor assembly as defined in claim 1, wherein the base defines a projection disposed about the electrode and projecting towards the tip of the electrode, the projection in contact with the wall of the housing.

6. A sensor assembly as defined in claim 5, wherein the projection encircles the electrode.

7. A sensor assembly as defined in claim 5, wherein the projection is fused with the wall of the housing.

8. A sensor assembly for a magnetic flowmeter, comprising;
   an electrode assembly having,
      first and second electrodes spaced apart from each other, each electrode having a tip and a lower end, and
      a plastic base disposed about the lower ends of the first and second electrodes, the base defining first and second protrusions, each protrusion disposed about a corresponding electrode;
   a plastic housing molded about the electrode assembly and defining a cavity, the housing including an end wall in contact with the plastic base, the tips of the electrodes projecting from the end wall; and
   a magnetic assembly disposed within the cavity of the housing proximate to the first and second electrodes, the magnetic assembly configured to provide a magnetic field extending beyond the end wall of the housing.

9. A sensor assembly as defined in claim 8, wherein the first electrode and the second electrode each have an axial portion including the tip, the lower end of each electrode is oriented generally transverse to the axial portion.

10. A sensor assembly as defined in claim 8, wherein a portion of the plastic base is fused with the end wall of the plastic housing.

11. A sensor assembly as defined in claim 8, wherein the end wall of the housing includes parallel ridges spaced apart from each other defining a valley.

12. A sensor assembly as defined in claim 8, wherein the tips of the electrodes each project from a corresponding ridge of the end wall.

13. A sensor assembly as defined in claim 8, wherein each projection encircles the corresponding electrode.

14. A sensor assembly as defined in claim 13, wherein the projections are fused with the end wall of the housing.

* * * * *